United States Patent

[11] 3,621,035

[72] Inventors Andre Lakodey
Pierre-Benite;
Henri Mathais, Ste-Foy les Lyon; Francis Weiss, Pierre-Benite, all of France
[21] Appl. No. 868,640
[22] Filed Oct. 22, 1969
[45] Patented Nov. 16, 1971
[73] Assignee Ugine Kuhlmann
Paris, France
[32] Priority Oct. 22, 1968
[33] France
[31] 170,806

[54] PROCESS FOR PREPARING SUBSTITUTED LACTONES
8 Claims, No Drawings
[52] U.S. Cl. .................................................. 260/343,
260/343.5, 260/343.6, 260/30.4 R, 260/78 L,
260/77.5 AN, 260/76
[51] Int. Cl. ...................................................... C07d 9/00,
C07d 7/06, C07d 5/06
[50] Field of Search........................................... 260/343,
343.5, 343.6

[56] References Cited
UNITED STATES PATENTS
3,428,656 2/1969 Weiss............................ 260/343

*Primary Examiner*—John M. Ford
*Attorney*—Pennie, Edmonds, Morton, Taylor and Adams ABSTRACT: A process for preparing substituted lactones having the formula:

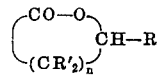

wherein R is a linear or branched alkyl radical having one to 12 carbon atoms, a cycloaklyl radical having three to 12 carbon atoms, or a phenyl radical, R' represents a hydrogen atom or an alkyl radical having one to four carbon atoms, $n$ is an integer number between two and 11, which comprises reacting a mixture of hydrogen peroxide and formic acid with a 1-substituted cycloalkene of the formula:

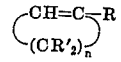

in which R has the same meaning as defined above.

PROCESS FOR PREPARING SUBSTITUTED LACTONES

BACKGROUND OF THE INVENTION

The article abstracted in *Chemical Abstracts* 1954, 48, 12,685 discloses the reaction of a 30 percent aqueous solution of hydrogen peroxide and formic acid at 88 percent and 1-substituted cycloalkenes and reports that the reaction of the hydrogen peroxide-formic acid mixture with 1-methyl cyclohexene lead to the formation of the corresponding diols, namely 1-methyl-1,2, cyclopentanediol and the 1-methyl 1,2 cyclohexanediol according to the conventional hydroxylation reaction.

The applicants have found, however, that 1-substituted cycloalkenes can be reacted with a mixture of hydrogen peroxide and formic acid in several intermediary stages to produce substituted lactones which are important industrial products.

SUMMARY OF THE INVENTION

The present invention relates to a process for preparing substituted lactones having the formula:

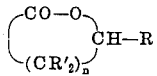

wherein R is a linear or branched alkyl radical having one to 12 carbon atoms, a cycloalkyl radical having three to 12 carbon atoms, or a phenyl radical, R' represents a hydrogen atom or an alkyl radical having one to four carbon atoms, $n$ is an integer number between two and 11, which comprises reacting a 1-substituted cycloalkene of the formula:

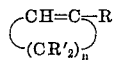

with a mixture of hydrogen peroxide and formic acid to react the cycloalkene with one molecule of hydrogen peroxide to form an intermediate compound and then reacting the intermediate compound with a mixture of hydrogen peroxide and formic acid to form the corresponding lactone.

The reaction of this invention is carried out according to the following general formula:

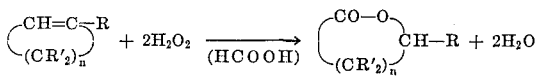

The applicant is not aware of the exact reaction mechanism by which the substituted lactones are produced. In theory, however, the reaction mechanism could involve the epoxidation of the double bond by the performic acid formed in situ resulting from the reaction between the hydrogen peroxide and the formic acid, then the isomerizing of the epoxide to the 2-substituted-cycloalkanone and finally the oxidizing of the latter to ω-substituted lactone by a second molecule of performic acid. A second hypothesis could involve the formation of the 1-substituted-1,2 cycloalkanediols or its formic esters normally expected, then the dehydration or removal of formic acid with a rearrangement to the 2-substituted cycloalkanone and finally the oxidizing of the latter to the corresponding substituted lactone.

The process of forming the 1-substituted lactones according to this invention can be varied with respect to the reaction conditions as well as the particular order of steps to carry out the various stages of the transformation of the cycloalkene to the corresponding lactone under the best conditions of speed and selectivity. The reaction temperature can vary between about −10° and 120° C. and the exact temperature selected will depend mainly upon the reactivity of the substituted cycloalkene being reacted. The reaction temperature can also be varied during the reaction as desired, for example, one can begin the addition of one or several of the reagents to the other at a low temperature, heat the mixture during or after the addition in order to permit the reaction to be completed. Applicants have found that it is most advantageous to carry out the reaction of a first molecule of hydrogen peroxide at a low temperature (from about −10° C. to 40° C.) and then heating this mixture at between about 60° to 120° C. to speed up the reaction to produce the intermediate product and then again lower the temperature of the reaction between −10° and 40° C. to react the intermediate product with a second molecule of hydrogen peroxide to produce the substituted lactones.

This preferred process of this invention is particularly advantageous where the substituted lactone being prepared is sensitive to hydrolysis or the acidolysis in an acid reaction medium. With respect to the sensitive substituted lactone, the first part of the process to form the intermediate product can be carried out in an acid medium and the acid medium partly neutralized before or during the second stage of the reaction, for instance by neutralizing 0.1 to 5 percent of the formic acid (and the strong acid, if used) with an alkaline substance such as a hydroxide of an alkaline or alkaline-earth metal, an ammoniacal base, such as, sodium hydroxide, potassium hydroxide, lime, barium hydroxide, ammonia, low molecular weight aliphatic amines, such as, methyl amine or ethyl amine, and so forth.

The process of this invention can be carried out in various manners. For example, the 1-substituted cyclohexene can be added to a mixture of hydrogen peroxide and formic acid that eventually was allowed to stand at room temperature to form performic acid or such a mixture of hydrogen peroxide and formic acid containing performic acid could be added to the substituted cyclohexene. The hydrogen peroxide can also be added to a mixture of the cyclohexene and formic acid to form the performic acid "in situ." The process can also be carried out in various other manners as will be apparent to those skilled in the art. The reactants should be gradually added to each other due to the exothermic nature of the reaction to prevent excessive temperature buildup.

The amount of time that the mixture of hydrogen peroxide and formic acid may stand at room temperature preferably should be long enough to form a certain amount of performic acid to carry out the intended reaction of this invention. Generally sufficient performic acid is formed, e.g. about 20–80 percent, if the mixture of hydrogen peroxide and formic acid is allowed to stand for about 2 hours at about room temperature. This time may vary, depending on the particular concentrations of hydrogen peroxide and formic acid as well as the temperature, but these variables could be readily determined by routine experimentation by one skilled in the art.

The amount of hydrogen peroxide that can be used to form the substituted lactones according to this invention can be a stoichiometric quantity or an amount less than or in excess of the stoichiometric quantity. When less than the stoichiometric quantity of hydrogen peroxide is used untransformed or unreacted cycloalkene as well as the partial products of transformation to the intermediate product are present in the reaction mixture and these products can be recycled to another first stage operation. When an excess of hydrogen peroxide is used, the excess hydrogen peroxide is difficult to recover and it is thus advantageous to use only a moderate excess. In practice it has been found to be advantageous to use between about 1.5 and 3 moles of hydrogen peroxide per mole of 1-substituted cyclohexene. Hydrogen peroxide of a quality which is commercially available can be employed. Aqueous solutions of hydrogen peroxide between about 30 to 90 percent by weight of hydrogen peroxide are also preferred.

The amount of formic acid that can be used can also be varied, but it is advantageous to use between about 1 and 15 moles of formic acid per mole of hydrogen peroxide. It is also preferred to use the formic acid in its pure state or in an aqueous solution containing at least about 70 percent by weight of formic acid.

The reaction normally takes place in the absence of any catalyst, however it can be advantageous, according to the reactivity of the 1-substituted cycloalkene utilized, to add a small quantity of a catalyst chosen among the strong mineral acids and the alkoyl- or arylsulfonic acids, at the rate of about 0.1 to 20 percent by weight, based on the formic acid. Such catalysts are well known and the hydrochloric acid, sulfuric acid, phosphoric acid, methane-sulfonic acid and p-toluenesulfonic acid can be mentioned as examples. These catalysts have an effective action especially upon the intermediary reaction of rearrangement. It is generally advisable to neutralize the catalysts to effect the second part of the oxidization and this should be taken into account when calculating the basis quantity to add into the medium for the neutralization.

The reaction can be carried out discontinuously or continuously. If continuous, the reaction can be carried out in a set of reaction vessels disposed in series, working at the same temperature or each being regulated at a different temperature. All of reagents and reactants can be introduced into the first reaction vessel, and the mixture allowed to flow out into the successive reaction vessels, or to add one or the other of the reagents or reactants between two or several reaction vessels, in order to spread out the release of heat.

The substituted lactone can be separated from the reaction mixture by known manners, for example, by fractional distillation, after a contingent neutralizing of the acid catalyst.

As nonlimiting examples of utilizable 1-substituted cycloalkenes that can be used and 1-substituted lactones that can be obtained therefrom according to the invention the following can be mentioned by way of example:

| 1-Substituted Cycloalkene Reacted | Substituted Lactones Obtained |
| --- | --- |
| methyl-1-cyclopentene | δ-methyl δ-valerolactone |
| ethyl-1-cyclopentene | δ-ethyl δ-valerolactone |
| methyl-1-cyclohexene | ε-methyl ε-caprolactone |
| ethyl-1-cyclohexene | ε-ethyl ε-caprolactone |
| isopropyl-1-cyclohexene | ε isopropyl ε-caprolactone |
| t-butyl-1-cyclohexene | ε-t-butyl ε-caprolactone |
| trimethyl-1.5.5-cyclohexene | γ,γ, ε-trimethyl ε-caprolactone |
| cyclohexyl-1-cyclohexene | ε-cyclohexyl ε-caprolactone |
| phenyl-1-cyclohexene | ε-phenyl ε-caprolactone |
| methyl-1-cycloheptene | Ω-methyl Ω-oenantholactone |
| methyl-1-cycloundecene | Ω-methyl Ω-undecanolactone |
| methyl-1-cyclododecene | Ω-methyl Ω-dedecanolactone |

The substituted lactones of this invention, such as those described above, are well known, important industrial products and can be used in various manners well known to those skilled in the art, such as for the preparation of polymers utilized as plactizers for vinyl resins, such as polyvinyl chloride. The substituted lactones are also useful as intermediate products for preparing the corresponding substituted lactams or for preparing polyester-polyols utilized for making polyurethane resins in known manners.

EXAMPLE I 101 grams of methyl-1 cyclohexene (95 percent by weight—1 mole) were placed in a 0.75 liter reaction vessel equipped with a mechanical stirrer. A mixture of 232 grams of formic acid (99 percent by weight—5 moles) 48.5 grams of a 70 percent aqueous solution of hydrogen peroxide (1 mole) and 2.5 grams of sulfuric acid (98 percent by weight) were then introduced into the reaction vessel over a period of 35 minutes while maintaining the temperature of the reactants at 30° C. After all of this mixture had been added to the reaction vessel, the stirring was continued for 25 minutes at 30° C. The reaction mixture was then brought to the boiling point and maintained at this temperature for 1 hour. The reaction mixture was then cooled down to 20° C. and 4 grams of ammonium bicarbonate added to neutralize the sulfuric acid.

A mixture of 232 grams of formic acid (99 percent by weight) and 48.5 grams of a 70 percent aqueous solution of hydrogen peroxide that had been permitted to stand and react for 2 hours at 20 C. was then gradually added to the reaction mixture over a period of 30 minutes while maintaining the reaction mixture at 20° C. After the end of the addition of this second mixture, the stirring was continued for 30 minutes at 20° C.

The reaction mixture was then fractionally distilled in the conventional manner to separate and recover the conventions of the reaction mixture. The water and the formic acid were distilled under a pressure of 20 mm. mercury at the boiling temperature which reached 60° C. The pressure was then reduced to 0.2–0.5 mm. mercury and the distillation continued between 72° and 90° C. and 86 grams of εmethyl εcaprolactone (67 percent of the theoretical yield) was recovered. The reaction mixture was then further distilled between 90° and 134° C. and 28 grams of formyloxy-6 heptanoic acid was recovered which represented 16 percent of the output. 28 grams of a residue remained containing polymers of ε-methyl caprolactone and ammonium sulfate formed during the neutralization operation.

EXAMPLE II 112 grams of ethyl-1 cyclohexene (98 percent by weight—1 mole) were substituted for the 101 grams of methyl-1 cyclohexene of example I and the reaction carried out in the identical manner as disclosed in example I using the same amounts of the other reactants and under identical process conditions. 80 grams of ε-ethyl ε-caprolactone distilling between 70° and 80° C. under 0.2 mm. Hg were recovered which represented 56 percent of the ultimate. 33 grams of formyloxy-6 octanoic acid representing 18 percent of the output were also obtained.

EXAMPLE III

Example I again was repeated, substituting 82 grams of methyl-1 cyclopentene (99 percent by weight—1 mole) for the 112 grams of ethyl-1 cyclohexene. All other reactants and reagents and their quantities as well as the process conditions being identical to the ones of example I. Upon distillation, 95 grams of ω-methyl ω-valerolactone representing 83 percent of the theoretical output were obtained.

We claim:

1. A process for preparing substituted lactones having the formula:

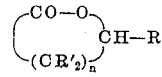

wherein R is linear or branched alkyl radical having one to 12 carbon atoms, a cycloalkyl radical having three to 12 carbon atoms, or a phenyl radical, R' represents a hydrogen atom or an alkyl radical having one to four carbon atoms, $n$ is an integer number between 2 and 11, which comprises reacting a 1-substituted cycloalkene of the formula:

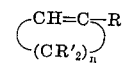

in which R has the same meaning as defined above, with a mixture of hydrogen peroxide and formic acid to react the 1-substituted cycloalkene with one molecule of hydrogen peroxide to form an intermediate compound and then further reacting the intermediate compound with a second molecule of hydrogen peroxide to form the corresponding lactone.

2. The process according to claim 1 in which the cycloalkene is first reacted with an aqueous solution of formic acid and hydrogen peroxide containing approximately 1 mole of hydrogen peroxide per mole of the cycloalkene to form a reaction mixture containing the intermediate compound and then adding to this reaction mixture a separate aqueous solution of formic acid and hydrogen peroxide also containing approximately 1 mole of hydrogen peroxide per mole of cycloalkene to form the corresponding substituted lactone.

3. The process according to claim 2 in which the aqueous mixture of formic acid and hydrogen peroxide added to the reaction mixture was permitted to stand a sufficient length of time to form performic acid.

4. The process according to claim 1 in which the first stage of the reaction is carried out at the temperature of between about −10° and 40° C. and then heated to a temperature of between about 60° and 120° C. to form the intermediate compound the reaction between the intermediate compound and the hydrogen peroxide-formic acid mixture is carried out at the temperature of between −10° and 40° C.

5. The process according to claim 1 in which the total amount of hydrogen peroxide is between about 1.5 and 3 moles per mole of substituted cyclohexene.

6. The process according to claim 5 in which the amount of formic acid is between about 1 to 15 moles per mole of hydrogen peroxide.

7. The process according to claim 1 in which the initial reaction between the mixture of hydrogen peroxide and formic acid and the cycloalkene is carried out in the presence of an acid catalyst.

8. The process according to claim 7 in which the acid catalyst is neutralized with an alkaline material prior to reacting the intermediate compound with a second molecule of hydrogen peroxide.

* * * * *

FO-1050
(5/69)

UNITED STATES PATENT OFFICE
CERTIFICATE OF CORRECTION

Patent No. 3,621,035          Dated November 16, 1971

Inventor(s) Andre Lakodey, Henri Mathais and Francis Weiss

It is certified that error appears in the above-identified patent and that said Letters Patent are hereby corrected as shown below:

Claim 4, column 5, line 13 "compound the reaction..." should read --compound and the reaction...--

Signed and sealed this 30th day of May 1972.

(SEAL)
Attest:

EDWARD M. FLETCHER, JR.          ROBERT GOTTSCHALK
Attesting Officer                 Commissioner of Patents